US011325241B1

(12) United States Patent
Thomas

(10) Patent No.: US 11,325,241 B1
(45) Date of Patent: May 10, 2022

(54) SAWHORSE EXTENSION RACK SYSTEM

(71) Applicant: Jay Thomas, East Greenville, PA (US)

(72) Inventor: Jay Thomas, East Greenville, PA (US)

(*) Notice: Subject to any disclaimer, the term of this patent is extended or adjusted under 35 U.S.C. 154(b) by 286 days.

(21) Appl. No.: 16/553,528

(22) Filed: Aug. 28, 2019

Related U.S. Application Data

(60) Provisional application No. 62/726,936, filed on Sep. 4, 2018.

(51) Int. Cl.
*B23Q 3/00* (2006.01)
*B25H 1/06* (2006.01)

(52) U.S. Cl.
CPC .................................... *B25H 1/06* (2013.01)

(58) Field of Classification Search
CPC ...................................................... B25H 1/06
USPC ................................ 269/309, 296, 303, 902
See application file for complete search history.

(56) References Cited

U.S. PATENT DOCUMENTS

| | | | | |
|---|---|---|---|---|
| 801,431 A | 10/1905 | Adams | | |
| 835,059 A | 1/1906 | Curley | | |
| 2,753,222 A | 8/1955 | Foresta et al. | | |
| 4,192,406 A * | 3/1980 | Mitchell | B25H 1/06 | 182/185.1 |
| 4,375,245 A * | 3/1983 | Schill | B25H 1/06 | 182/155 |
| 4,638,885 A * | 1/1987 | Frederick | B25H 1/06 | 182/151 |
| 4,877,109 A | 10/1989 | Welch et al. | | |
| 5,101,932 A * | 4/1992 | Trudgeon | F16B 7/22 | 182/129 |
| 5,377,780 A | 1/1995 | Dunaway | | |
| 5,417,307 A | 5/1995 | McIntyre et al. | | |
| D372,988 S * | 8/1996 | Schulz | B25H 1/06 | D25/68 |
| 6,123,173 A | 9/2000 | Patros | | |
| 6,755,282 B1 | 1/2004 | Herold | | |
| 2010/0006734 A1* | 1/2010 | Connell | B25H 1/06 | 248/440 |

* cited by examiner

*Primary Examiner* — Joseph J Hail
*Assistant Examiner* — Shantese L McDonald

(57) ABSTRACT

A sawhorse extension rack system incorporates two vertical extension portions coupled to a sawhorse and having openings for receiving and retaining work-pieces. The two vertical extension portions are coupled to opposing ends of the sawhorse and have a beam retainer opening that slides over a support beam extending from the sawhorse. The vertical extension portions extend up from the sawhorse and each have first and second vertical support members and one or more cross-supports to produce one or more openings to receive a work-piece. A user may slide the first and second vertical extension over the support beam and then position one or more work-pieces in the openings to increase work capacity.

14 Claims, 5 Drawing Sheets

SAWHORSE EXTENSION RACK SYSTEM

CROSS REFERENCE TO RELATED APPLICATIONS

This application claims the benefit of priority to U.S. provisional patent application No. 62/726,936, filed on Sep. 4, 2018; the entirety of which is hereby incorporated by reference herein.

BACKGROUND OF THE INVENTION

Field of the Invention

The invention relates to a sawhorse extension rack system having two vertical extension portions that are coupled with a support beam extending from the sawhorse.

Background

Construction work often requires working on two or more pieces of lumber at one time. When painting or staining boards, it is often required to place the boards across a rack to allow them to dry before use. Conventional sawhorses have limited space for placing boards for painting and staining. In another example, a plurality of fasteners may be required to be inserted into a plurality of boards for subsequent attachment to a structure. Picking up and positioning each board on a sawhorse and the removing to pick and place a second board is time consuming and requires more energy, One option is to buy more sawhorses in order to accommodate a larger number of boards, however this is expensive and requires transporting and setting up additional sawhorses.

SUMMARY OF THE INVENTION

The invention is directed to a sawhorse extension rack system having two vertical extension portions coupled to the sawhorse and having openings for receiving and retaining work-pieces. The two vertical extension portions are coupled to opposing ends of the sawhorse and have a beam retainer opening that slides over a support beam extending from the sawhorse. The vertical extension portions extend up from the sawhorse and each have first and second vertical support members and one or more cross-supports to produce one or more openings to receive a work-piece. A user may slide the first and second vertical extension over the support beam and then position one or more work-pieces in the openings to increase work capacity.

The support beam may be part of the sawhorse or may be an attachment to the sawhorse. The support beam may be attached to the top support of the sawhorse by a beam retainer, such as a fastener of clamp, for example, A fastener may be a screw or bolt having a nut to secure the support beam to the sawhorse. The support beam has a support beam extension that extends out from the legs of the sawhorse to enable the extension portion to be slid thereover. The width of the support beam extension may be about 10 inches or less, about 8 inches or les about 6 inches or less, about 4 inches or less and any range between and including the widths provided.

Exemplary first and second extension portion have substantially the same dimensions and the openings may be aligned to allow work-pieces to be retained in a horizontal manner between the first and second extension portions. The first and second extension portions each have a first and second vertical support members that extend up substantially parallel to each other at an offset distance or width therebetween. Substantially parallel means within about 10 degrees or each other, as used herein. The one or more cross-supports extend between the first and second vertical support members to produce the openings. It is to be noted that the cross-supports may have different widths and the openings may have different widths. A preferred embodiment may be consistent opening widths however to enable the first and second vertical support members to be a single board or support.

The first and second vertical support members of an exemplary sawhorse extension rack system may have height that is no more than 5 ft, no more than 4 ft, no more than 3 ft and any range between and including the heights provided. If the height is too great it may make it difficult for placement of work-pieces in the openings. The first and second extension portions of an exemplary sawhorse extension rack system may have opening widths that are no more than 12 inches, no more than 8 inches, no more than 6 inches and any range between and including the widths provided. Exemplary first and second extension portions may have a plurality of cross-support members extending between the first and second vertical supports to produce a plurality of openings. Exemplary first and second extension portions may have two or more openings, three or more openings, five or more openings, no more than six openings and any range between and including the number of openings provided. An exemplary extension portion may have no more than about four openings to enable work-pieces to be inserted and removed without complication. To many openings may make each opening to small or have a low opening height which may make it difficult to insert work-pieces.

An exemplary extension portion comprises two vertical support members that have the top-beam support and bottom beam support configured therebetween to produce the beam retainer opening and one or more cross-supports to produce two or more openings. This configuration makes for easy manufacturing of the extension portions.

The summary of the invention is provided as a general introduction to some of the embodiments of the invention and is not intended to be limiting, Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
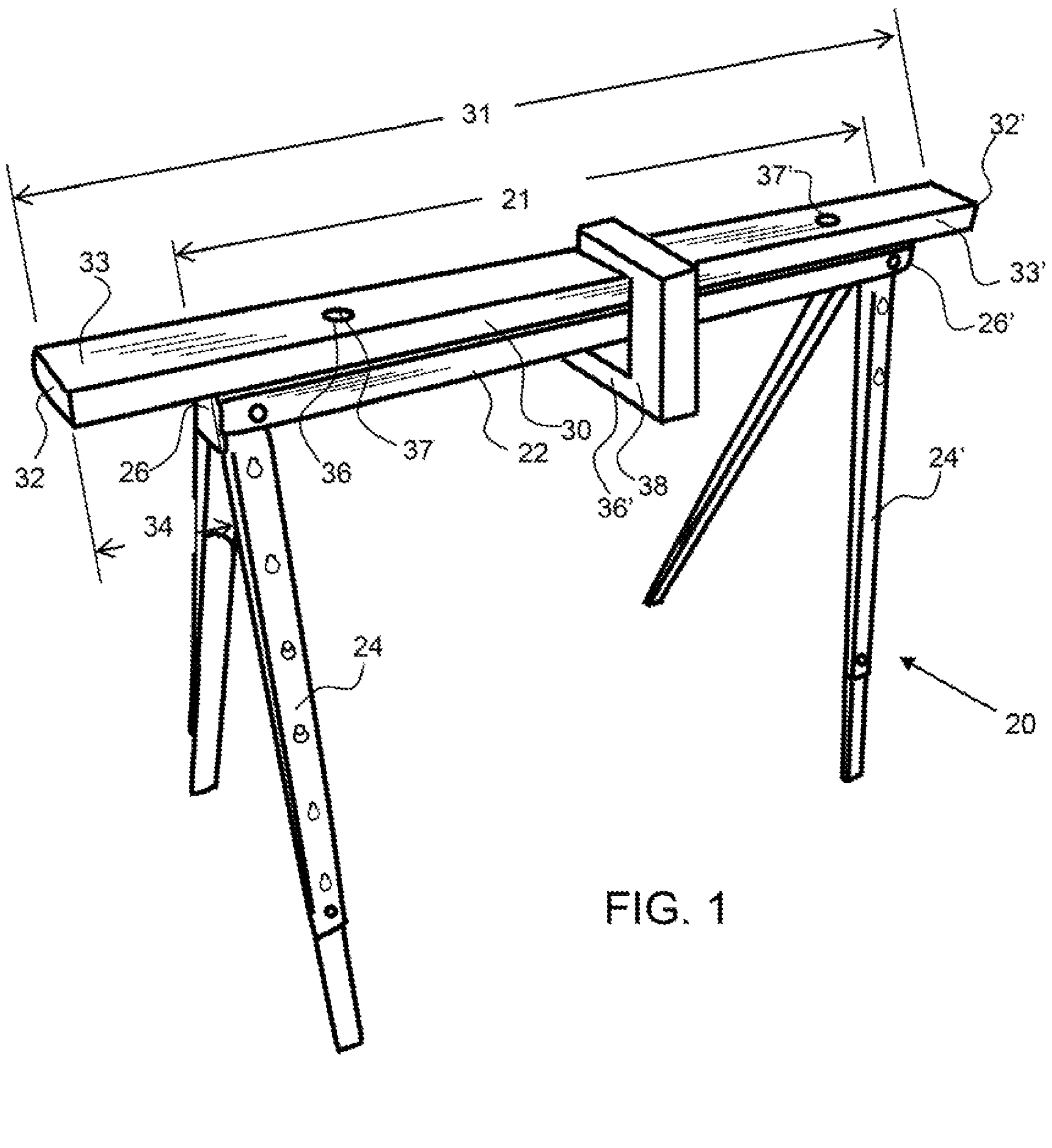
FIG. 1 shows an exemplary sawhorse with a support beam coupled to the top support of the sawhorse.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
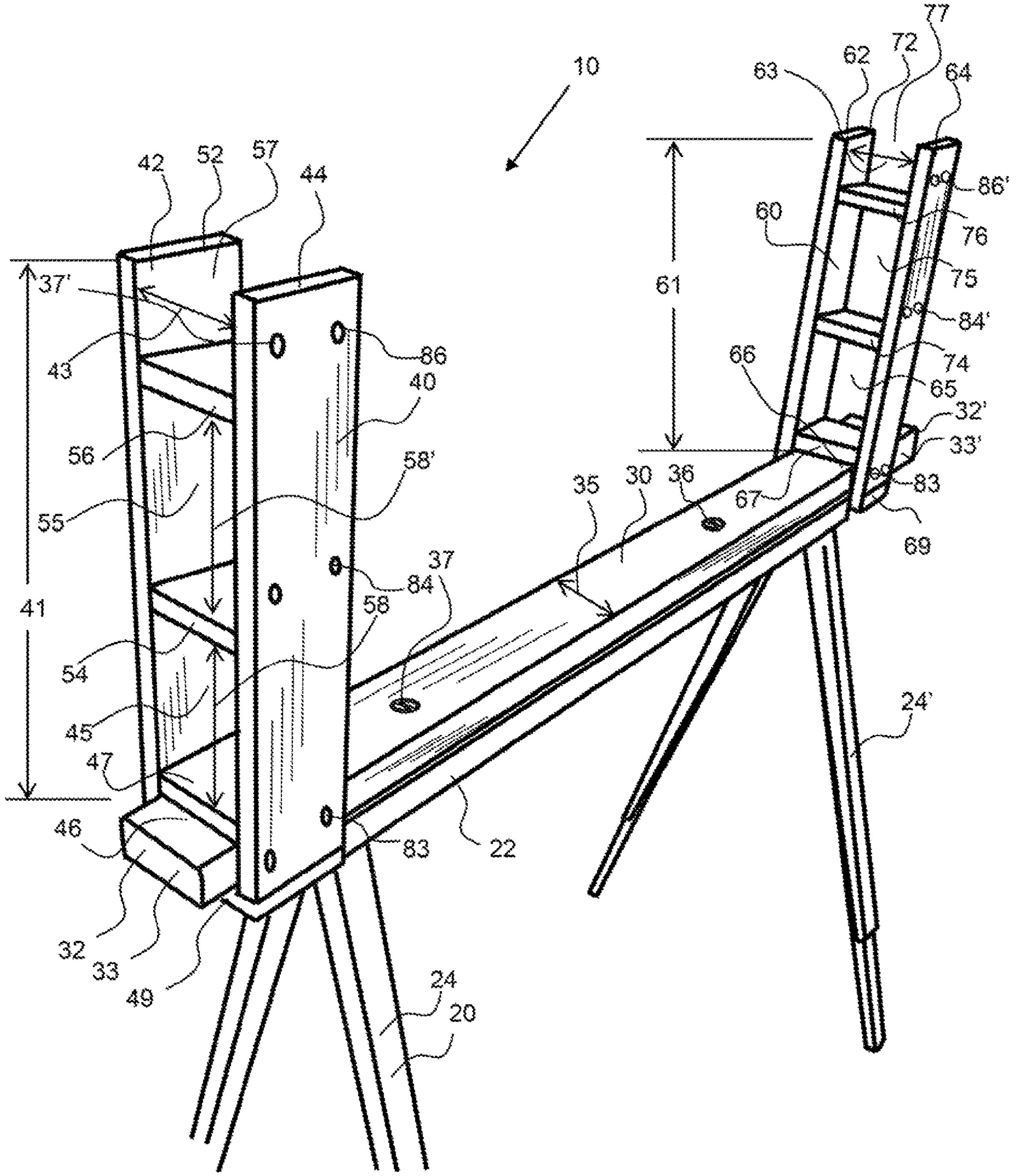
FIG. 2 shows an exemplary sawhorse extension rack system having a first and second extension portion coupled to a support bean extending out from the sawhorse.

As shown in FIG. 1, an exemplary sawhorse 20 has a support beam 30 coupled to the top support 22 of the sawhorse. The support beam may be secured to the sawhorse by a beam retainer 36, 36', such as one or more fasteners 37, 37' and/or a clamp 38, respectively. An exemplary fastener is a screw or bolt and may preferably be a bolt having a nut to secure the bolt to the top support of the sawhorse. The support beam 30 extends from the extended end 26 of the top support 22 of the sawhorse, or out from the legs of the sawhorse 24, 24'. In some cases, the support beam may be part of the sawhorse, wherein the top support simply extends out from the legs of the sawhorse to allow attachment of the first and second extension portions, as shown in FIG. 2. The support beam has a length 31 that is greater than the length 21 of the top support. The support beam has a support beam extension 33 having a length 34 from the extended end 26 of the top support to the extended end 32 of the support beam. The support beam extension is configured to allow detachable attachment of the first and second extension portions of the sawhorse extension rack.

Referring to FIGS. 2 to 5, an exemplary sawhorse extension rack system 10 has a first extension portion 40 and second extension portion 60 coupled to a support bean 30 extending out from the extended end 26 of the sawhorse. The first extension portion is detachably attached to the support beam 30 by a beam retainer opening 46, wherein the first extension portion is slid over the extended end 32 of the support beam to secure the first extension portion to the support beam. The beam retainer opening 46 is formed by a first vertical support member 42 and a second vertical support member 44, a bottom beam support 49 and a top beam support 47. The beam retainer opening 46 may have a width that is slightly larger than the width 35 of the support beam 35 to enable a secure retention of the extension portion to the support beam. The second extension portion 60 is detachably attached to the support beam 30 by a beam retainer opening 66, wherein the second extension portion is slid over the extended end 32' of the support beam to secure the first extension portion to the support beam. The beam retainer opening 66 is formed by a first vertical support member 62 and a second vertical support member 64, a bottom beam support 69 and a top beam support 67. The beam retainer opening 46 may have a width that is slightly larger than the width 35 of the support beam 35 to enable a secure retention of the extension portion to the support beam. The support beam 30 may further be retained by fasteners configured through one or more beam retainer apertures 83 that may be configured in the first or second vertical support members of the first or second extension portions. A screw may be used to secure the support beam 30 to the first and second extension portions by inserting and fastening the screw through the beam retainer apertures.

A preferred support beam is rectangular in shape, such as a board which may be a conventional 2×4 board, a wooden board having a width of about 3.5 inches and a height of about 1.5 inches. The width of the support beam and associated bean retainer opening may be about the same as the width of the opening in the extension portions or may be different. For example, the width of the beam retainer opening may be configured to around a 2×4 board, and one of more of the extension portion openings, 45, 55, or 57 may have a larger or smaller width. One or more of the openings in the extension portion may be configured to accept a 2×6 or 2×8 board, for example. Also, the height of the openings, 58, 58' may be configured to receive one or multiple boards and may be about 2 inches or more, about 4 inches or more, about 8 inches or more, about 10 inches or more, about 12 inches or more and any range between and including the heights provided. Insertion of a work-piece may be facilitated by having a much larger extension portion opening height and/or width than the height and width of the work-piece.

The first extension portion comprises a first vertical support member 42 and second vertical support member 44 that extend up from the sawhorse, and a plurality of cross-supports 54, 56 that extend between the vertical support members to produce openings 45, 55 for retaining work-pieces. The width 43 between the first and second vertical support members may be configured to accepted work-piece of a desired size. The top or extended end 52 of the first vertical support member is open, having an opening 57 to receive yet another work-piece. A second extension portion 60 is configured on the opposing end of the sawhorse and is coupled to the support beam extension 33' on the opposing end. The second extension portion is detachably attached to the support beam 30 by a beam retainer opening 66, wherein the first extension portion is slid over the extended end 32' of the support beam to secure the second extension portion to the support beam. The beam retainer opening 66 is formed by the first and second vertical support members, a bottom beam support 69 and a top beam support 67. The second extension portion comprises a first vertical support member 62 and second vertical support member 64 that extend up from the sawhorse, and a plurality of cross-supports 74, 76 that extend between the vertical support members to produce openings 65, 75 for retaining work-pieces. The width 63 between the first and second vertical support members may be configured to accepted work-piece of a desired size and may be substantially the same as the width between the vertical support members of the first extension portion. The top or extended end 72 of the first vertical support member is open, having an opening 77 to receive yet another work-piece. The openings between the first and second extension portions maybe aligned to enable a work-piece to be placed and retained on the cross-supports, as shown in FIGS. 3 and 4.

Figure 3:
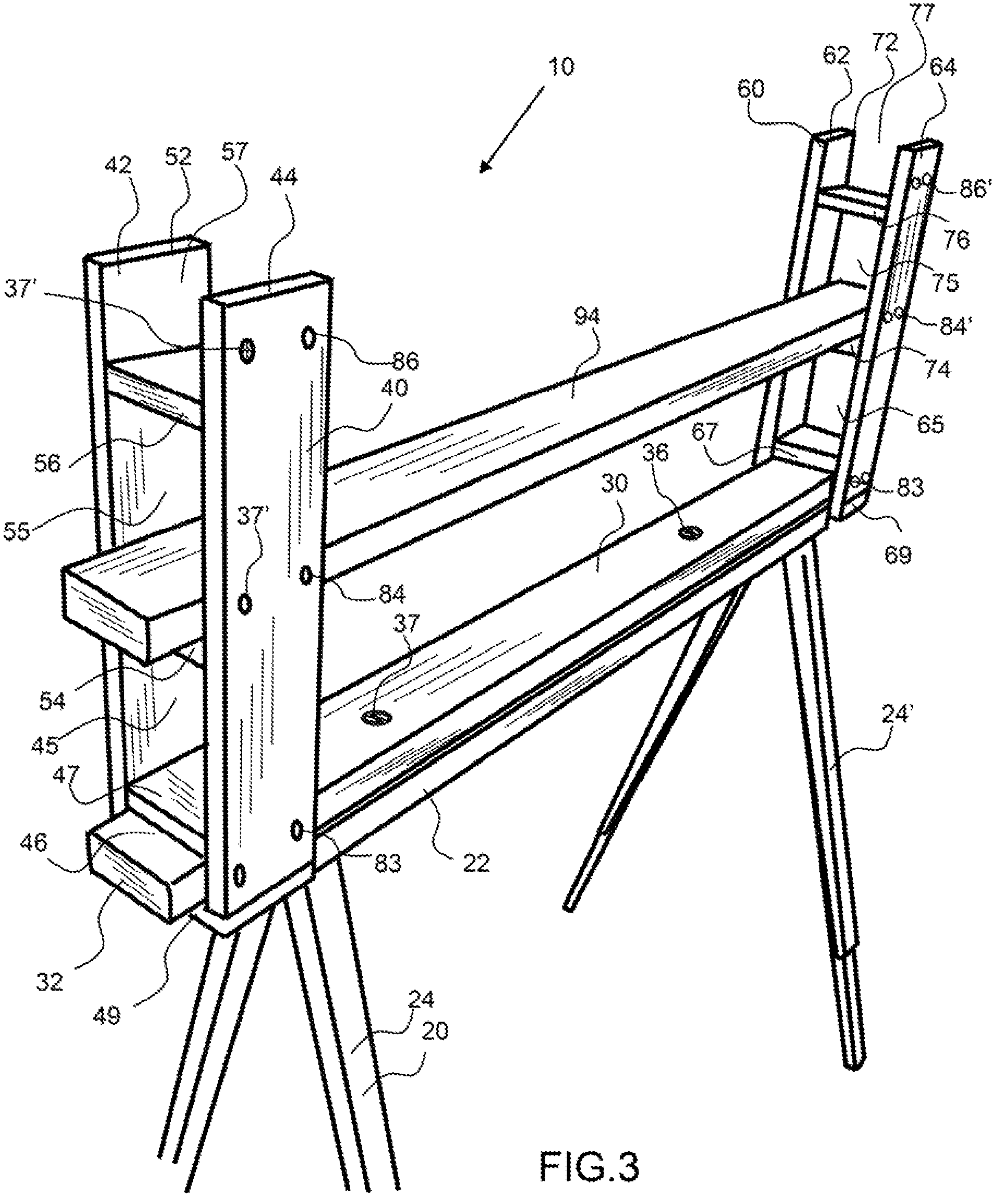
FIG. 3 shows the exemplary sawhorse extension rack system shown in FIG. 2, with a plurality of work-pieces retained therein.

As shown in FIG. 3, a work-piece 94 is configured between opening 55 and 75 and is supported by first cross-supports 54 and 74. The work-piece 94 may be further retained by a fastener, such as a screw, extending through one or more second work-piece retainer apertures 84 in the first vertical support and/or the second vertical support of the first extension portion 40, and/or the second extension portion 60. As show in FIG. 3, a fastener 37' is configured through one of the second work-piece retainer apertures 84 in the second vertical support of the first extension portion. Note that the second work-piece retainer apertures 84 are configured above the first cross-supports 54, 74, to ensure a fastener engages with a work-piece laying on the first cross-supports.

Figure 4:
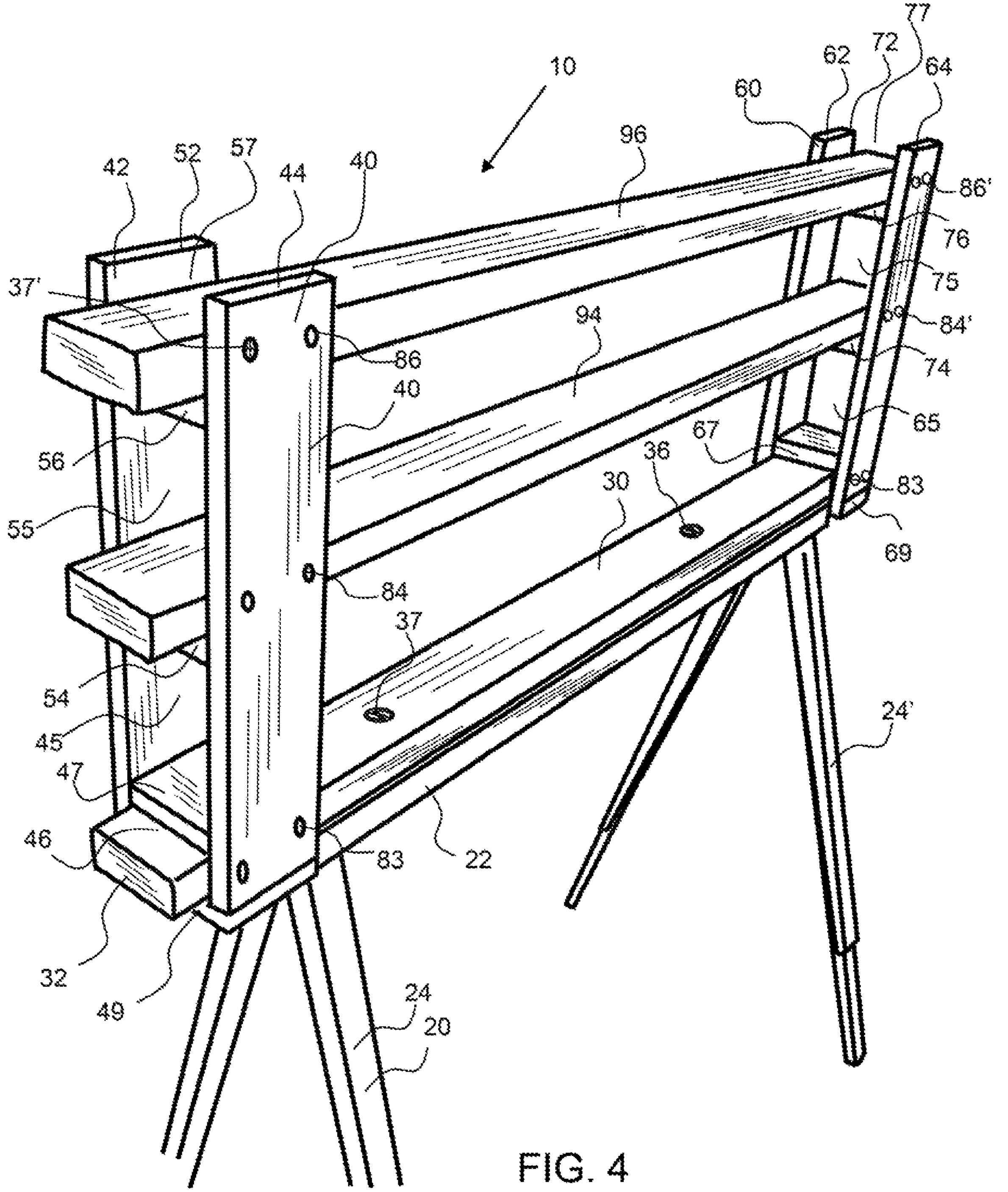
FIG. 4 shows the exemplary sawhorse extension rack system shown in FIG. 2, with a plurality of work-pieces retained therein.
Figure 5:
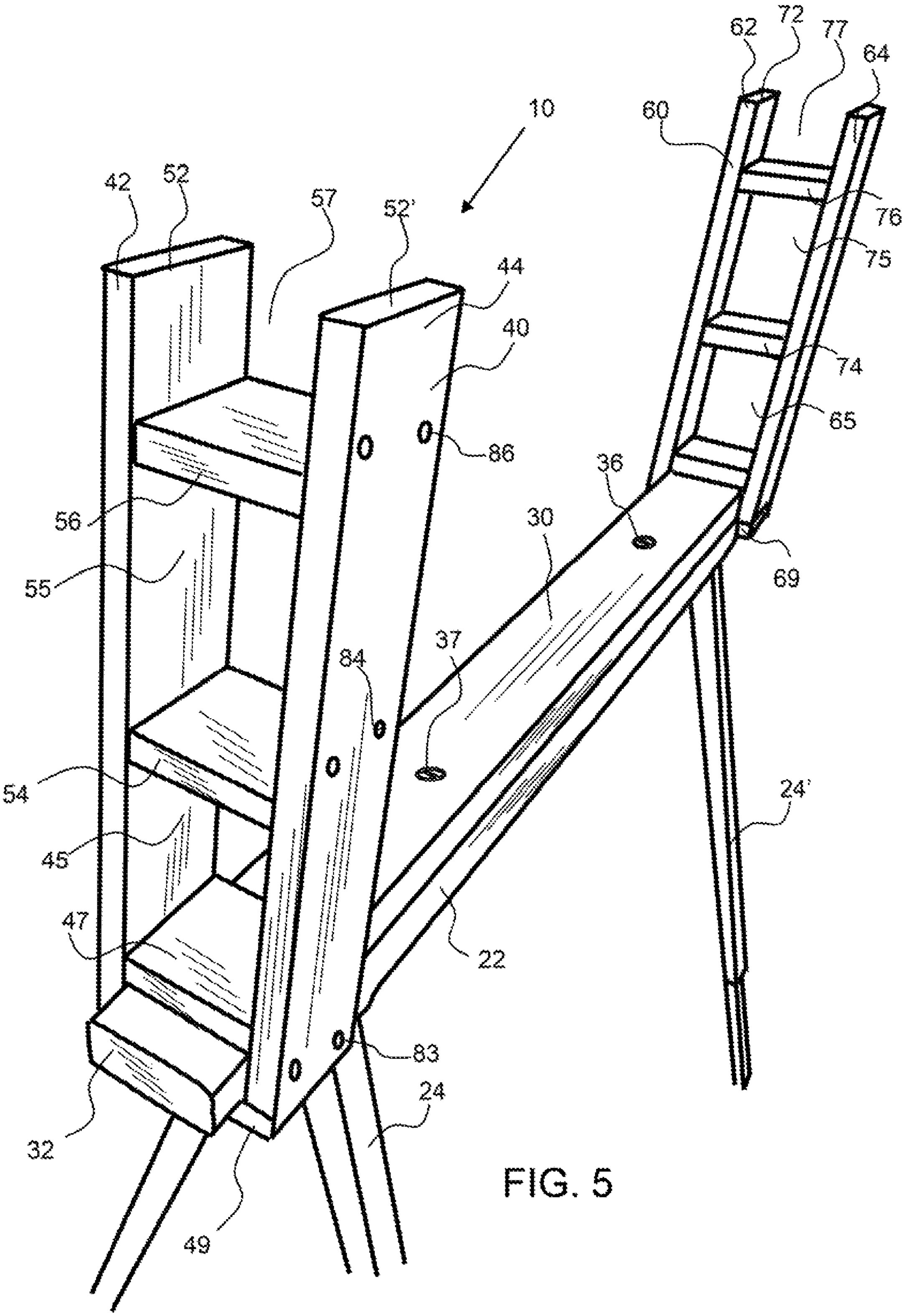
FIG. 5 shows the exemplary sawhorse extension rack system shown in FIG. 2, with a plurality of work-pieces retained therein.

As shown in FIG. 4, another work-piece 96 is configured between the second opening 57 and 77 and is supported by second cross-supports 56 and 76. The work-piece 96 may be further retained by a fastener, such as a screw, extending through one or more third work-piece retainer apertures 86 in the first vertical support and/or the second vertical support of the first extension portion 40, and/or the second extension portion 60. As show in FIG. 4, a fastener 37' is configured through one of the second work-piece retainer apertures 86 in the second vertical support of the first extension portion. Note that the third work-piece retainer apertures 86 are configured above the second cross-supports 56, 76, to ensure a fastener engages with a work-piece laying on the second cross-supports. It is to be noted that another work-piece may be configured between openings 45 and 65 and supported by top beam supports 47, 67. Any number of openings may be configured between the vertical support members of the first and second extension portions to produce a plurality of work-piece supports as desired.

The exemplary sawhorse extension rack is configured for retaining work-pieces and therefore the height of the extension portions 41, 61, may be no more than about 5 ft, no more than about 4 ft, no more than about 3 ft and any range between and including the heights provided. It is desirable to enable insertion and removal of work-pieces when standing on the ground. The sawhorse may have a height to the top support of about 2 ft to 4 ft and therefore extension portions that have a height of more than 5 ft may make it difficult to reach the top opening.

It will be apparent to those skilled in the art that various modifications, combinations and variations can be made in the present invention without departing from the scope of the invention, Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A sawhorse extension rack system comprising:

a) a sawhorse having a top support extending from a first top support end to a second top support end of said sawhorse;

wherein said sawhorse has legs extending from said first top support end and legs extending from said second top support end;

b) a support beam;

wherein said support beam has a first support beam end and a second support beam end;

wherein the first support beam end extends past the first top support end and the second support beam end extends past the second top support end;

c) a first extension portion detachably attached to said first support beam end between said first support beam end of the support beam and said legs on said first top support end of said sawhorse;

d) a second extension portion detachably attached to said second support beam end between said second support beam end of the support beam and said legs on said second top support end of said sawhorse;

wherein each of the first and second extension portions comprise:

i) a beam retainer opening comprising a top beam support and a bottom beam support and configured to receive the support beam;

ii) a first vertical support member and a second vertical support member that extend up from the beam retainer opening having a width therebetween;

iii) a plurality of cross-supports extending between the first and second vertical support members to produce a plurality of openings;

wherein the sawhorse extension rack system is configured to receive and retain a work-piece in the openings, wherein the work-piece is configured to rest on the cross-supports.

2. The sawhorse extension rack system of claim 1, wherein the height of the first and second extension portion is no more than 4 ft.

3. The sawhorse extension rack system of claim 1, wherein the height of the first and second extension portion is no more than 3 ft.

4. The sawhorse extension rack system of claim 1, wherein the opening width of the opening in the first and second extension portions is no more than 12 inches.

5. The sawhorse extension rack system of claim 1, wherein the opening width of the opening in the first and second extension portions is no more than 8 inches.

6. The sawhorse extension rack system of claim 1, wherein the opening width of the opening in the first and second extension portions is no more than 6 inches.

7. The sawhorse extension rack system of claim 1, comprising between one and four openings in each of the first and second extension portions.

8. The sawhorse extension rack system of claim 1, wherein the support beam is secured to the top support of the sawhorse by a beam retainer.

9. The sawhorse extension rack system of claim 8, wherein the beam retainer is a fastener.

10. The sawhorse extension rack system of claim 8, wherein the beam retainer is a clamp.

11. The sawhorse extension rack system of claim 1, wherein the first and second vertical support members of the first and second extension portions are 2×4 boards.

12. The sawhorse extension rack system of claim 11, wherein the opening width is no more than about 4 inches.

13. The sawhorse extension rack system of claim 1, further comprising work-piece retainer apertures configured in at least one of the first or second vertical support member of the first or second extension portions.

14. The sawhorse extension rack system of claim 13, comprising at least one work-piece retainer aperture configured above at least one of the first cross-supports of the first or second extension portions and at least one work-piece retainer aperture configured above at least one of the second cross-supports of the first or second extension portions.

* * * * *